United States Patent [19]

Katzman

[11] 3,868,477

[45] Feb. 25, 1975

[54] FACSIMILE SYSTEM CONTRAST ENHANCEMENT

[75] Inventor: Howard Katzman, Santa Clara, Calif.

[73] Assignee: Dacom, Inc., Sunnyvale, Calif.

[22] Filed: June 20, 1973

[21] Appl. No.: 371,748

[52] U.S. Cl. .......... 178/6, 178/DIG. 3, 178/DIG. 34

[51] Int. Cl. .......... H04n 1/38

[58] Field of Search .......... 178/DIG. 3, DIG. 34, 6, 178/6.6 R, 6.6 B, 6.7 R; 325/38 B

[56] References Cited

UNITED STATES PATENTS

| | | | |
|---|---|---|---|
| 3,249,690 | 5/1966 | Schubert | 178/DIG. 3 |
| 3,294,896 | 12/1966 | Young | 178/DIG. 3 |
| 3,613,103 | 10/1971 | Harris | 178/6.6 R |
| 3,739,084 | 6/1973 | Heinrich | 178/DIG. 3 |

*Primary Examiner*—Howard W. Britton
*Assistant Examiner*—Michael A. Masinick

[57] ABSTRACT

A binary facsimile communication system employing an automatic contrast enhancement method and apparatus wherein a binary output represents either a black level decision or a white level decision, all incoming video signals on one side of a preselected threshold level voltage producing a black level decision and all incoming video signals on the opposite side of the threshold level voltage producing a white level decision, a novel circuit operating when a predetermined change in the video signal input occurs to trigger a change in the binary output from one state to the other state even though the change is not sufficient to cause the video input signal to pass through said preselected threshold level voltage.

10 Claims, 3 Drawing Figures

FACSIMILE SYSTEM CONTRAST ENHANCEMENT

BACKGROUND OF THE INVENTION

Present day facsimile communications systems, wherein a facsimile of a text, picture, drawing or the like is transmitted long distances over telephone lines, operate at the sending site to convert the black and white type of original document to a code suitable for telephone line transmission. At the receiving end, the coded transmitted signal is then decoded and reproduced as a facsimile in black and white of the original document. In the simplest form of encoding, the original document is scanned and then converted into a binary output signal with only two levels, a black level and a white level, with no provision for the grey scale. If the output of the scanner is above a certain threshold voltage, then an output of one level is generated, i.e., either black or white, while for all outputs below the certain threshold voltage, the output of the other level is generated. Once this threshold level is fixed, all scanner output signals on one side of the level are transmitted as a white level code while all scanner output signals on the other side of the level are transmitted as a black level code.

This either-or situation does not provide for instances of low contrast wherein adjacent areas on a document being scanned would best be converted to a black and white code, but the output signals for the two areas are both on the same side of the threshold voltage and will both be coded as either black or white. Therefore, this low contrast region will not be detected. For example, in scanning the printed letter O, the center region of the O may not be white enough to produce the white code output, but may actually be in the grey scale falling on the black side of the threshold voltage. Therefore, the black O form as well as the center region will be transmitted as black, and the letter O will be reproduced as an all black circle.

SUMMARY OF THE PRESENT INVENTION

The present invention provides a novel contrast enhancement apparatus for use in a facsimile communication system which improves the reliability of binary facsimile transmission for low contrast originals. The circuit operates on low contrast areas of the original document and processes these areas as if the areas were high contrast areas, thus providing a high fidelity reproduction. In the example given above for an O with a shaded center, the shaded center region will be processed as a full white region, and the O will be faithfully reproduced.

The novel circuit of this invention, like the prior art circuits, is provided with a preset threshold level at which the normal transition from black to white and from white to black occurs. In addition, this novel circuit operates to sense a change in the video analog signal output of the scanner from a particular level representing one state, e.g. black, toward the other level representing the other state, e.g. white. Should the change in the analog signal toward said other level reach a certain differential voltage value, for example 10 percent of the peak-to-peak voltage between the full black and full white levels, the circuit operates to produce the transition in the binary output signifying a change from said one full level to the other full level, e.g. from full black to full white, even though the scanner output has not passed through the preset threshold level between black and white. In this manner the binary circuit will respond to a preselected differential change rather than awaiting an actual change to the preset threshold level. Should the analog signal level then reverse and change back toward said one level a preselected differential amount, then the circuit will operate to produce a transition in the binary output signifying a change back to said one level, e.g. from white to black.

DESCRIPTION OF THE PREFERRED EMBODIMENTS

Figure 1:
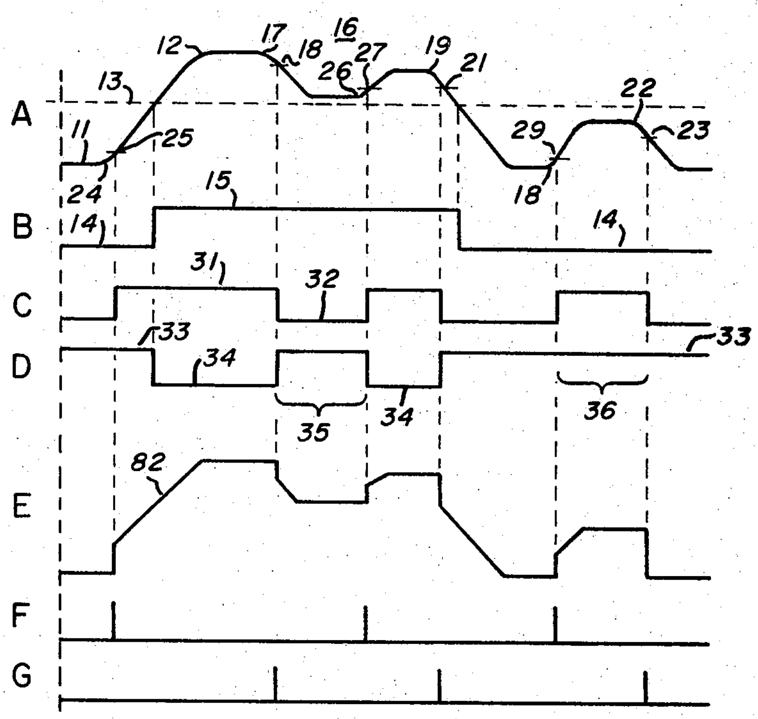
FIG. 1 shows several signal traces illustrating the operation of the contrast enhancement system incorporating the present invention.

Referring now to FIG. 1, trace A represents the video output signal from a typical scanner stage in the transmitter section of a known form of a facsimile communication system. The lowest amplitude level 11 of the signal represents the scanner output for full white while the highest amplitude level 12 of the signal represents the scanner output for full black; the portion of the voltage between the full white level and the full black level represents the grey scale. In this simple illustration, the level 13 halfway between full white and full black is selected as the transition threshold; any scanner output amplitude above the threshold level 13 is converted to a binary output representing full black and any scanner output amplitude below the threshold level is converted to a binary output representing full white. This binary output is shown in trace B where level 14 represents full white and level 15 represents full black. The binary output B in turn is converted by well known techniques to a form easily transmitted over a telephone line, for example one frequency $f_1$ for the low state 14 representing full white and a different frequency $f_2$ for the high state 15 representing full black.

The section 16 in curve A represents the output from the scanner when scanning a low contrast region which is not full black but is high enough in the grey scale so as to be above the threshold amplitude 13. This region could, for example, be the central area in the printed letter O which, in the ideal situation, would be full white but which is, in fact, a shade of grey. Since the scanner output for this shaded area does not reach the halfway level 13, in conventional systems it is reproduced as the binary output 15 representing full black, an undesirable end result.

The novel circuit of the present invention operates to convert the scanner output signal representing these low contrast areas into binary transitions resulting in such areas being transmitted as full white areas. The conversion of the low contrast region 16 in the black section to full white is used to illustrate the present invention since it will be obvious to any person skilled in the art that a low contrast region in the white half of scanner output could be converted to full black utilizing the same technique described in the present illustration.

The circuit of the present invention senses when the scanner output moves in a direction from a black level such as full black level 12 towards a white level such as full white level 11 and over a particular voltage span, for example a differential change of 5 percent or 10 percent of full scale peak-to-peak from full white level 11 to full black level 12. Such differential changes are illustrated by the variation from point 17 to point 18, by the variation from point 19 to point 21, and by the variation from point 22 to point 23. Variations extending in the direction from white to black of the same differential value are shown by the change from point 24 to point 25, by the change from point 26 to point 27, and by the change from point 38 to point 29. The novel circuit of this invention responds to these differential variations to produce a second binary signal represented by trace C with a level 31 corresponding to a black transition and a level 32 corresponding to a white transition.

The simple binary video trace B produced in response to passage through the white forcing threshold voltage level 13 is combined with the enhanced binary video trace C to produce the resultant two level black/-white binary video output signal D which is converted in a suitable encoder to the desired code for transmittal over the telephone line. The high level 33 of trace D represents a "white level" decision output while the low level 34 represents a "black level" decision output. It is noted that the "white level" decision made by the enhanced video signal circuit (trace C) and represented by region 35 overrides the "black level" decision made by the simple binary video circuit (trace B) in this region. It is also noted that the "black level" decision made by the enhanced video signal circuit (trace C) and represented by region 36 is overridden by the "white level" decision made by the simple binary video circuitry (trace B) in this region. Therefore, a significant change towards the white level while the system is operating in the black level region above the threshold voltage 13 will result in a transition to a "black decision" output. An equal change towards the black level while the system is operating in the white level region below the threshold voltage 13 will not result in a change and the output will remain a "white decision."

Figure 2:
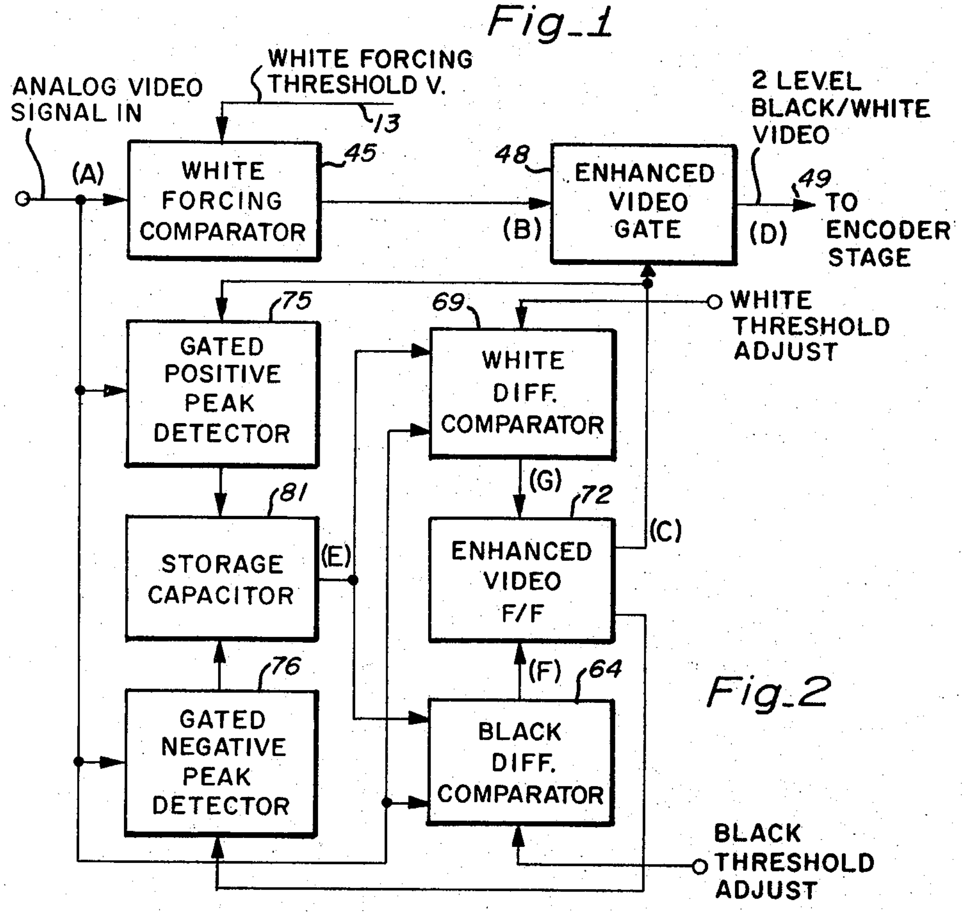
FIG. 2 is a block diagram of a preferred embodiment of the present system.
Figure 3:
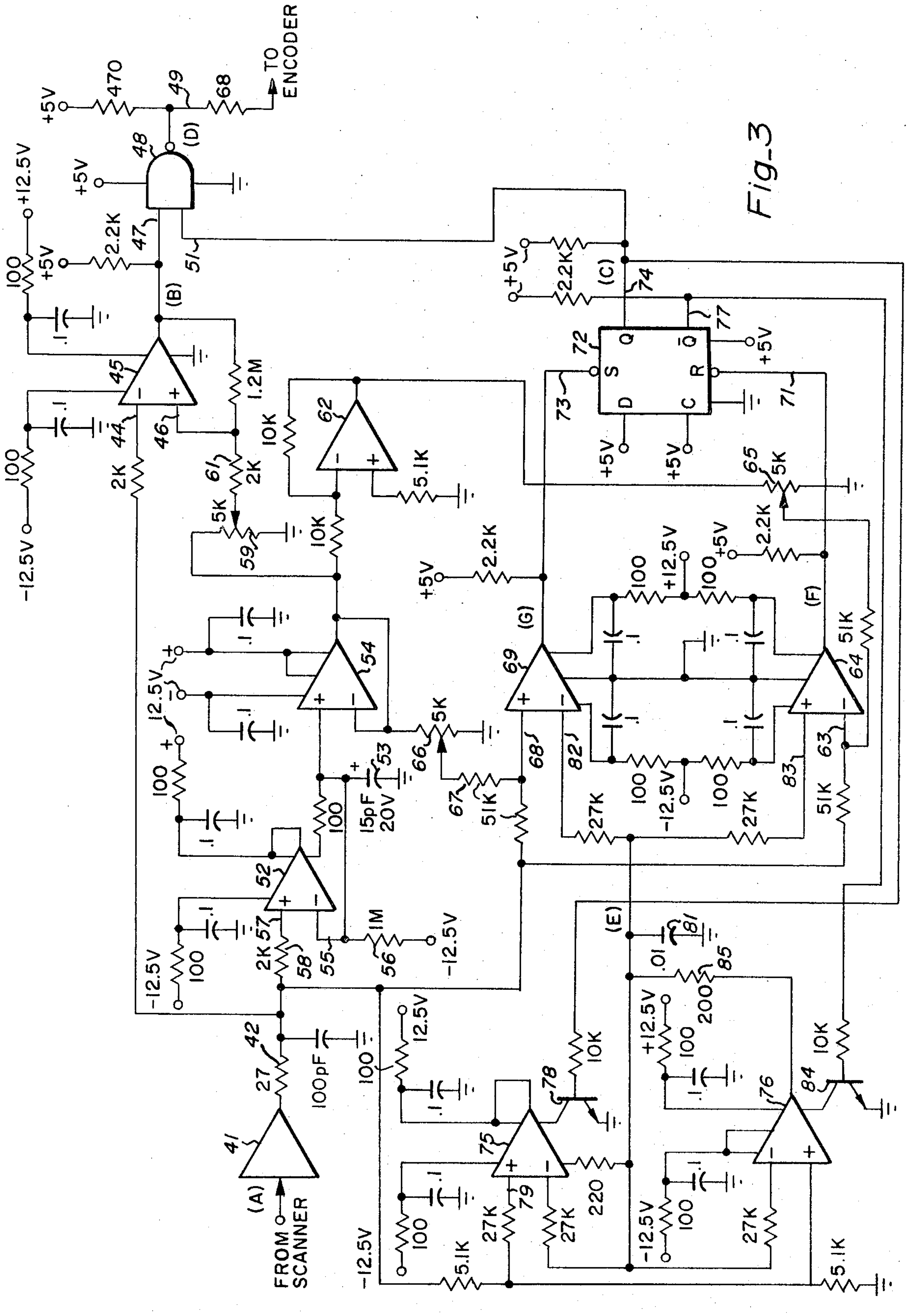
FIG. 3 is a schematic diagram of the system of FIG. 2.

Referring now to FIGS. 2 and 3 one preferred embodiment of the present invention is shown in block diagram form and in schematic diagram form, respectively.

The video input signal from the scanner stage (trace A) is applied to the input of an amplifier 41 used to set the input signal level. The output of amplifier 41 is coupled via an input filter circuit comprising resistor 42 and capacitor 43 to the negative input 44 of a white forcing comparator 45 where it is compared with the white forcing threshold voltage 13 coupled to the positive input 46 of comparator 45. The output (trace B) of the white forcing comparator 45 is coupled to one input 47 of a NAND gate 48 forming the enchanced video gate. When the video signal input on the negative input 44 is lower than the white threshold forcing voltage on the other input 46, the output of comparator 45 goes low, and this low on gate 48 will produce a high on the output 49 regardless of the state of the other input 51 to the gate 48, this high output serving as a "white decision" output to the subsequent encoding stage (not shown). This white level output signal is then encoded in well known manner for transmission over telephone lines, or for other transmission as desired. This situation is shown in traces B and D wherein the white lever 14 of trace B will force the white level output 33 of trace D.

If the input analog signal level is greater than the white forcing reference voltage 13, i.e. above the level 13 as viewed in trace A, the simple binary video output of the white forcing comparator 45 goes high and permits the NAND gate 48 to respond to the video enhancement circuitry coupled to input 51, such that the output 49 will respond to the enhancement voltage output (trace C), the gate 48 responding to the differential voltage changes such as point 17 to 18, point 26 to 27, and point 19 to 21. Therefore, the region of the analog input between points 18 and 27 will result in a "white level" decision output from gate 48 as seen by the white level transition of region 35 in trace D even though still above the reference level 13.

The white forcing threshold voltage is developed by a video signal input peak detector stage comprising a positive peak detector including comparator 52 and capacitor 53 and a follower amplifier 54. A reference voltage is applied to the negative input 55 of the peak detector circuit via resistor 56, and the video input signal is applied to the positive input 57 of the peak detector circuit via resistor 58. The output of the comparator 52 charges up the capacitor 53 to a value dependent upon the peak positive voltage of the video input signal. Because of its slow decay time, the capacitor 53 will remain charged to this value. The voltage stored in capacitor 53 serves as one input to the follower amplifier 54 which responds to this peak voltage value and provides the white forcing threshold voltage output level 13 to the positive input 46 of the white forcing comparator 45 via the adjustable resistor circuit comprising resistors 59 and 61. This adjustment circuit enables the operator to adjust the white forcing threshold level 13 to a desired level relative to the positive peak value of the incoming video signal.

In trace (A) of FIG. 1 this threshold level 13 is shown at about halfway between the peak-to-peak voltages, although in actual use it is generally set closer to the white level, for example one third the distance from the white level. If the incoming analog video signal is less than the reference voltage, the simple binary video output from the comparator 45 to the enhanced video gate 48 forces the gate 48 to produce an output dictating a "white level" decision.

The output of the follower amplifier 54 is coupled to an inverter amplifier 62, the output of amplifier 62 being coupled to one input 63 of a black differential comparator 64 and serves as the black threshold adjust voltage. This black threshold voltage is coupled to comparator 64 via the adjustable resistor 65 such that the level of this black threshold voltage may be adjusted by the operator.

The output of the follower amplifier 54 is also coupled via the adjustable resistor circuit comprising resistors 66 and 67 to the positive input 68 of a white differential comparator 69, this adjustable voltage serving as the white threshold adjust voltage for the white differential comparator 69.

The output (trace F) of the black differential comparator 64 is utilized to control the reset input 71 to an enchanced video flip-flop circuit 72 while the output of the white differential comparator 69 (trace G) controls the set input 73. The Q output 74 of flip-flop 72 (trace C) is coupled to the second input 51 of the enhanced video gate 48 and serves to control the output of the gate 48 during those periods when the output of the white forcing comparator 45 is high, i.e. during the periods when the incoming video signal is on the black level side of the threshold voltage 13. As noted above, when the output of the white forcing comparator 45 is low, the enhanced video signal (trace C) has no effect on the output of gate 48.

The flip-flop 72 also controls a gated positive peak detector 75 via the $\overline{Q}$ output 74 and a gated negative peak detector 76 via the Q output 77. When the Q output 74 is high (with the $\overline{Q}$ output 77 necessarily low), the gate 78 is turned on and the positive peak detector 75 is activated. The video input signal is coupled to the positive input 79 of the positive peak detector 75 and, on activation by gate 78, the output of the positive peak detector charges up the capacitor 81 (see trace E of FIG. 1).

Assume that the Q output 74 of flip-flop 72 is high, and that therefore the gate 78 is on and the capacitor 81 is charging up responsive to an increasing video input as depicted by the slope 82 in trace E. The capacitor 81 charges up to a positive peak level responsive to the increase in the video input to the black level 12 and the capacitor 81 remains charged to this peak voltage. Now, when the video signal level decreases a certain preselected amount, for example 5 or 10 percent as depicted by the change from point 17 to point 18 in trace A, the charge remains on the capacitor 81 and serves as a reference voltage applied to the negative input 82 of the white differential comparator 69 and applied to the positive input 83 of the black differential comparator 64. When the video signal input level declines to point 18, the input level on the positive input 68 of the white differential comparator 69 serves to operate this comparator 69 and its output goes high (trace G). Thus, the black differential comparator 64 compares the algebraic difference between the analog video signal and the voltage stored on the capacitor 81 with the black threshold adjust voltage.

The high output of the black differential comparator is applied to the set input 73 of the enhanced video flip-flop 72. Flip-flop 72 operates to place a low on the Q output 74 and a high on the $\overline{Q}$ output 77. The low on the Q output 74 operates the NAND gate 48 to produce a high on its output (as seen by region 35 of trace D) that serves as a "white decision" input to the encoder stage. This "white decision" is made even though the video input is still on the black level side of the threshold level 13.

The corresponding high on the $\overline{Q}$ output 77 of the flip-flop 72 turns on gate 84 while the low on the Q output 74 turns off gate 78. The negative peak detector 76 is therefore activated and capacitor 81 immediately discharges through resistor 85 until the charge on the capacitor 81 reaches the level of the video signal input on the other input 63, and thereafter the charge on the capacitor 81 (trace E) decreases and then levels off while tracking the input from point 18 to point 26.

This charge on the capacitor 81 thus serves as the reference level to the two differential comparators 64 and 69 such that, when the video input reverses and increases from point 26 to 27, the black differential comparator 64 operates (trace F) to place a true on the reset input 71 to the flip-flop 72, flip-flop 72 operating to place a high on Q output 74 and a low on the $\overline{Q}$ output 77.

The high on the Q output 74 operates the enhanced video gate 48 to place a low on its output which serves as a "black decision" to the following encoder stage.

Gate 78 is turned on and gate 84 is turned off, and the capacitor 81 immediately charges up to the existing video input signal level and then the charge increases as the capacitor storage voltage tracks the video input signal level.

When the video input signal varies from point 19 to point 21, the circuit responds in the same manner as described above when point 18 was reached, and a "white decision" is transmitted by the gate 48 to the encoder stage.

Now, when the video input signal varies from point 28 to point 29 the black differential comparator 64 operates to place a true on the reset input 71 of flip-flop 72 which operates to place a high on the Q output 74. However, since at this time a low exists on the other input to the gate because the white forcing comparator 45 has operated when the video signal passed below the threshold voltage 13, the "white decision" remains on the output of the gate 48.

Therefore, the circuit will respond to the differential changes 17 to 18 and 19 to 21 to produce the binary transition from a "black decision" to a "white decision" and will respond to the differential change 26 to 27 to produce the binary transition from a "white decision" to a "black decision," even though the analog video input signal is above the threshold voltage level 13. However, the circuit will not produce binary transitions in response to the voltage changes 24 to 25, 28 to 29, and 22 to 23, since the "white decision" imposed when the video signal input is below the threshold level 13 dominates.

It should be noted that, although the invention has been described as employed to produce "white decisions" responsive to preselected differential changes while the video input is still in the "black decision" region above the threshold level 13, the same technique may be employed to produce "black decisions" responsive to preselected differential changes while the video input is in the "white decision" region relative to the threshold level.

What is claimed is:

1. Apparatus for producing a binary signal output responsive to an analog signal input, said binary signal output in a first state serving as a black level decision output and in a second state serving as a white level decision output, comprising means for producing a threshold level, means for comparing the level of said analog signal input with said threshold level to produce one of said binary output states when said analog signal level is on one side of said threshold level and produce the other of said binary output states when said analog signal level is on the other side of said threshold level, and means operative when said binary output is in one of said two different states for detecting a preselected change in the level of the analog input and for changing the binary output to the other of said two different states in response to said preselected change.

2. Apparatus as claimed in claim 1 wherein said means for detecting the preselected change operates to change the binary output when said binary output is in said first state serving as a black level decision output, said binary output being changed to a white level decision output.

3. Apparatus as claimed in claim 1 wherein said means for detecting a preselected change in the level of the analog input comprises means for detecting the peak level of said analog signal, and means for comparing this peak level with a subsequent analog signal input level which varied from said peak level by said preselected level change.

4. Apparatus as claimed in claim 3 wherein said means for detecting the preselected change operates to change the binary output when said binary output is in said first state serving as a black level decision output, said binary output being changed to a white level decision output.

5. Apparatus as claimed in claim 1 wherein said means for comparing the level of said analog signal input with said threshold level comprises a first level comparator circuit and a gate coupled to the output thereof, said gate providing said binary signal output, and wherein said means for detecting a preselected change in the level of the analog input comprises means for detecting the peak level of said analog signal, means for comparing this peak level with a subsequent analog signal input level which varied from said peak level by said preselected level change, and means controlled by said latter comparing means for controlling said gate.

6. Apparatus as claimed in claim 5 wherein said means for detecting the preselected change operates to change the binary output when said binary output is in said first state serving as a black level decision output, said binary output being changed to a white level decision output.

7. The method for producing a binary signal output responsive to an analog signal input, said binary signal output in a first state serving as a black level decision output and in a second state serving as a white level decision output comprising the steps of producing a threshold voltage level, comparing the level of said analog signal input with said threshold level to produce one of said binary output states when said analog signal level is on one side of said threshold level and produce the other of said binary output states when said analog signal level is on the other side of said threshold level, detecting a preselected change in the level of the analog input when said binary output is in one of said two different states, and changing the binary output to the other of said two different states responsive to detection of said preselected change.

8. The method as claimed in claim 7 wherein the step of detecting the preselected change occurs when said binary output is in said first state serving as a black level decision output to change the binary output to the second state serving as a white level decision output.

9. The method as claimed in claim 7 wherein said step of detecting a preselected change in the level of the analog input comprises the step of detecting the peak level of said analog signal and thereafter comparing this peak level with a subsequent analog signal input level which varied from said peak level by said preselected level change.

10. The method as claimed in claim 9 wherein the step of detecting the preselected change occurs when said binary output is in said first state serving as a black level decision output to change the binary output to the second state serving as a white level decision output.

* * * * *